US010088886B2

(12) United States Patent
Tamura

(10) Patent No.: US 10,088,886 B2
(45) Date of Patent: Oct. 2, 2018

(54) SEMICONDUCTOR DEVICE COMPRISING POWER GATING DEVICE

(71) Applicant: SEMICONDUCTOR ENERGY LABORATORY CO., LTD., Atsugi-Shi, Kanagawa-Ken (JP)

(72) Inventor: Hikaru Tamura, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 363 days.

(21) Appl. No.: 14/151,880

(22) Filed: Jan. 10, 2014

(65) Prior Publication Data
US 2014/0208142 A1    Jul. 24, 2014

(30) Foreign Application Priority Data

Jan. 24, 2013  (JP) .................. 2013-010716

(51) Int. Cl.
 *G06F 1/26* (2006.01)
 *G06F 1/32* (2006.01)
(52) U.S. Cl.
 CPC .......... *G06F 1/3206* (2013.01); *G06F 1/3237* (2013.01); *G06F 1/3275* (2013.01);
 (Continued)
(58) Field of Classification Search
 CPC .... G06F 1/3206; G06F 1/3237; G06F 1/3275; G06F 1/3278; G06F 1/3287;
 (Continued)

(56) References Cited

U.S. PATENT DOCUMENTS 5,457,790 A * 10/1995 Iwamura ............... G06F 1/26
 711/167
5,731,856 A   3/1998 Kim et al.
 (Continued)

FOREIGN PATENT DOCUMENTS

EP   1 737 044 A1   12/2006
EP   2 226 847 A2    9/2010
 (Continued)

OTHER PUBLICATIONS

Ohara, H et al., "Amorphous In—Ga—Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.
 (Continued)

*Primary Examiner* — Jaweed A Abbaszadeh
*Assistant Examiner* — Volvick DeRose
(74) *Attorney, Agent, or Firm* — Fish & Richardson P.C.

(57) ABSTRACT

Supply of power to a plurality of circuits is controlled efficiently depending on usage conditions and the like of the circuits. An address monitoring circuit monitors whether a cache memory and an input/output interface are in an access state or not, and performs power gating in accordance with the state of the cache memory and the input/output interface. The address monitoring circuit acquires and monitors an address signal between a signal processing circuit and the cache memory or the input/output interface periodically. When one of the cache memory and the input/output interface is in a standby state and the other is in the access state, power gating is performed on the circuit that is in the standby state.

17 Claims, 13 Drawing Sheets

(52) U.S. Cl.
CPC .......... *G06F 1/3278* (2013.01); *G06F 1/3287* (2013.01); *G06F 1/3203* (2013.01); *Y02D 10/128* (2018.01); *Y02D 10/13* (2018.01); *Y02D 10/14* (2018.01); *Y02D 10/157* (2018.01); *Y02D 10/171* (2018.01); *Y02D 50/20* (2018.01)

(58) Field of Classification Search
CPC ............ Y02B 60/1221; Y02B 60/1225; Y02B 60/1228; Y02B 60/126; Y02B 60/1282; Y02B 60/32
See application file for complete search history.

(56) References Cited

U.S. PATENT DOCUMENTS

| | | | |
|---|---|---|---|
| 5,734,913 | A | 3/1998 | Iwamura et al. |
| 5,744,864 | A | 4/1998 | Cillessen et al. |
| 6,088,808 | A | 7/2000 | Iwamura et al. |
| 6,294,274 | B1 | 9/2001 | Kawazoe et al. |
| 6,563,174 | B2 | 5/2003 | Kawasaki et al. |
| 6,671,815 | B2 | 12/2003 | Iwamura et al. |
| 6,727,522 | B1 | 4/2004 | Kawasaki et al. |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al. |
| 7,282,782 | B2 | 10/2007 | Hoffman et al. |
| 7,297,977 | B2 | 11/2007 | Hoffman et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,443,759 | B1* | 10/2008 | Rowlands ................ G11C 7/20 365/227 |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 8,046,615 | B2 | 10/2011 | Taguchi et al. |
| 8,547,771 | B2* | 10/2013 | Koyama .................. G11C 8/04 365/226 |
| 2001/0046027 | A1 | 11/2001 | Tai et al. |
| 2002/0056838 | A1 | 5/2002 | Ogawa |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0038446 | A1 | 2/2004 | Takeda et al. |
| 2004/0127038 | A1 | 7/2004 | Carcia et al. |
| 2005/0017302 | A1 | 1/2005 | Hoffman |
| 2005/0199959 | A1 | 9/2005 | Chiang et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0106990 | A1* | 5/2006 | Benhase ............ G06F 12/0804 711/135 |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0169973 | A1 | 8/2006 | Isa et al. |
| 2006/0170111 | A1 | 8/2006 | Isa et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0033432 | A1* | 2/2007 | Pecone ................... G06F 1/305 714/6.12 |
| 2007/0033433 | A1* | 2/2007 | Pecone ................... G06F 1/305 714/6.13 |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0166834 | A1 | 7/2008 | Kim et al. |
| 2008/0182358 | A1 | 7/2008 | Cowdery-Corvan et al. |
| 2008/0224133 | A1 | 9/2008 | Park et al. |
| 2008/0239780 | A1* | 10/2008 | Sasaki ................... G11O 5/025 365/51 |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0296568 | A1 | 12/2008 | Ryu et al. |
| 2009/0068773 | A1 | 3/2009 | Lai et al. |
| 2009/0073325 | A1 | 3/2009 | Kuwabara et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0278122 | A1 | 11/2009 | Hosono et al. |
| 2009/0280600 | A1 | 11/2009 | Hosono et al. |
| 2009/0295769 | A1 | 12/2009 | Yamazaki et al. |
| 2010/0007632 | A1 | 1/2010 | Yamazaki |
| 2010/0065844 | A1 | 3/2010 | Tokunaga |
| 2010/0092800 | A1 | 4/2010 | Itagaki et al. |
| 2010/0097354 | A1 | 4/2010 | Ahn et al. |
| 2010/0109002 | A1 | 5/2010 | Itagaki et al. |
| 2010/0134534 | A1 | 6/2010 | Seesselberg et al. |
| 2010/0156851 | A1 | 6/2010 | Kurokawa |
| 2011/0314314 | A1* | 12/2011 | Sengupta ............... G06F 1/3228 713/323 |
| 2013/0031397 | A1* | 1/2013 | Abe ....................... G06F 1/3225 713/324 |
| 2013/0191673 | A1 | 7/2013 | Koyama et al. |
| 2013/0326157 | A1* | 12/2013 | Hara ................... G06F 12/0891 711/144 |
| 2014/0317436 | A1* | 10/2014 | Yuasa ................. G06F 11/1441 714/3 |
| 2017/0024000 | A1* | 1/2017 | Chen ..................... G06F 1/3275 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 04-143819 A | 5/1992 |

(56) References Cited

FOREIGN PATENT DOCUMENTS

| | | |
|---|---|---|
| JP | 05-251705 A | 9/1993 |
| JP | 08-264794 A | 10/1996 |
| JP | 11-505377 A | 5/1999 |
| JP | 11-75205 A | 7/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2009-116851 A | 5/2009 |
| JP | 2010-262362 A | 11/2010 |
| WO | 2004/114391 A1 | 12/2004 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn-Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn-Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium-Gallium-Zinc Oxide TFTS and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn-Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates, D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced At Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn-Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn-Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTS," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTS) for AMLCDS," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

(56) References Cited

OTHER PUBLICATIONS

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 As a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YBFE2O4, and YB2FE3O7 Types of Structures for Compounds in the In2O3 and SC2O3—A2O3—Bo Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350> C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector With Suppressed Voltage Loss for White Tandem OLEDS," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 in. QVGA AMOLED Display Using In—Ga—Zn-Oxide TFTS With a Novel Passivation Layer," SID Digest '09 : SID International Symposium Digest of Technical Papers, May 31, 2009, pp. 284-287.

* cited by examiner

SEMICONDUCTOR DEVICE COMPRISING POWER GATING DEVICE

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a semiconductor device, a display device, a light-emitting device, a driving method thereof, or a manufacturing method thereof. In particular, one embodiment of the present invention relates to, for example, a semiconductor device and a driving method.

2. Description of the Related Art

In recent years, techniques for reducing the power consumption of semiconductor devices such as microcomputers have been developed.

An example of such a semiconductor device is a microcomputer in which supply of power supply voltage to a central processing unit (CPU), a memory, and the like can be stopped in a period during which supply of power is not necessary (see Patent Document 1, for example).

REFERENCE

Patent Document 1: Japanese Published Patent Application No. 2009-116851

SUMMARY OF THE INVENTION

However, the power consumption of a conventional microcomputer is not sufficiently reduced. For example, in a conventional microcomputer, supply of power supply voltage to circuits such as a CPU and a memory is controlled at the same timing, so that the power supply voltage is also supplied to a circuit in which supply of power is essentially unnecessary; consequently, the microcomputer consumes unnecessary power.

In view of the problems, it is an object of one embodiment of the present invention to provide a low-power semiconductor device or the like having a novel structure. Alternatively, it is an object of one embodiment of the present invention to provide a semiconductor device or the like having a novel structure that can perform power gating efficiently. Alternatively, it is an object of one embodiment of the present invention to provide a semiconductor device or the like having a novel structure that can perform clock gating efficiently. Alternatively, it is an object of one embodiment of the present invention to provide a semiconductor device or the like having a novel structure that can reduce overhead power during power gating. Alternatively, it is an object of one embodiment of the present invention to provide a highly reliable semiconductor device or the like having a novel structure. Alternatively, it is an object of one embodiment of the present invention to provide a semiconductor device or the like having a novel structure.

Note that the description of these objects does not impede the existence of other objects. In one embodiment of the present invention, there is no need to achieve all the objects. Other objects will be apparent from and can be derived from the description of the specification, the drawings, the claims, and the like.

In one embodiment of the present invention, an address monitoring circuit monitors whether a cache memory and an input/output interface are in an access state or not, and performs power gating in accordance with the state of the cache memory and the input/output interface. Such a structure enables appropriate supply of power to each circuit and reduces unnecessary power consumption.

Specifically, the address monitoring circuit acquires and monitors an address signal between a signal processing circuit and the cache memory or the input/output interface periodically. When one of the cache memory and the input/output interface is in a standby state and the other is in the access state, power gating is performed on the circuit that is in the standby state.

One embodiment of the present invention is a semiconductor device that includes a signal processing circuit, a cache memory, and an input/output interface electrically connected to a bus line; an address monitoring circuit monitoring whether the signal processing circuit, the cache memory, and the input/output interface are in an access state or not; first to third switches that are electrically connected to the signal processing circuit, the cache memory, and the input/output interface, respectively, and select whether to supply power to each circuit in response to a power gating control signal; and a power control circuit outputting the power gating control signal in accordance with a state of the signal processing circuit, a state of the cache memory, and a state of the input/output interface monitored by the address monitoring circuit.

In one embodiment of the present invention, the semiconductor device preferably includes first to third logic circuits that are electrically connected to the signal processing circuit, the cache memory, and the input/output interface, respectively, and select whether to supply a clock signal to each circuit in response to a clock gating control signal. The power control circuit preferably outputs the clock gating control signal in accordance with the state of the signal processing circuit, the state of the cache memory, and the state of the input/output interface.

In one embodiment of the present invention, the semiconductor device preferably includes a transistor including an oxide semiconductor film as a semiconductor layer and a capacitor between the first to third switches and the signal processing circuit, the cache memory, and the input/output interface.

In one embodiment of the present invention, in the semiconductor device, the clock gating control signal is preferably input to a gate of the transistor.

In one embodiment of the present invention, in the semiconductor device, the clock gating control signal preferably stops supply of the clock signal before the power gating control signal is switched to stop supply of the power.

In one embodiment of the present invention, in the semiconductor device, the clock gating control signal preferably restarts supply of the clock signal after the power gating control signal is switched to restart supply of the power.

According to one embodiment of the present invention, it is possible to provide a semiconductor device having a novel structure that can reduce power consumption by efficient power gating.

DETAILED DESCRIPTION OF THE INVENTION

Figure 1:
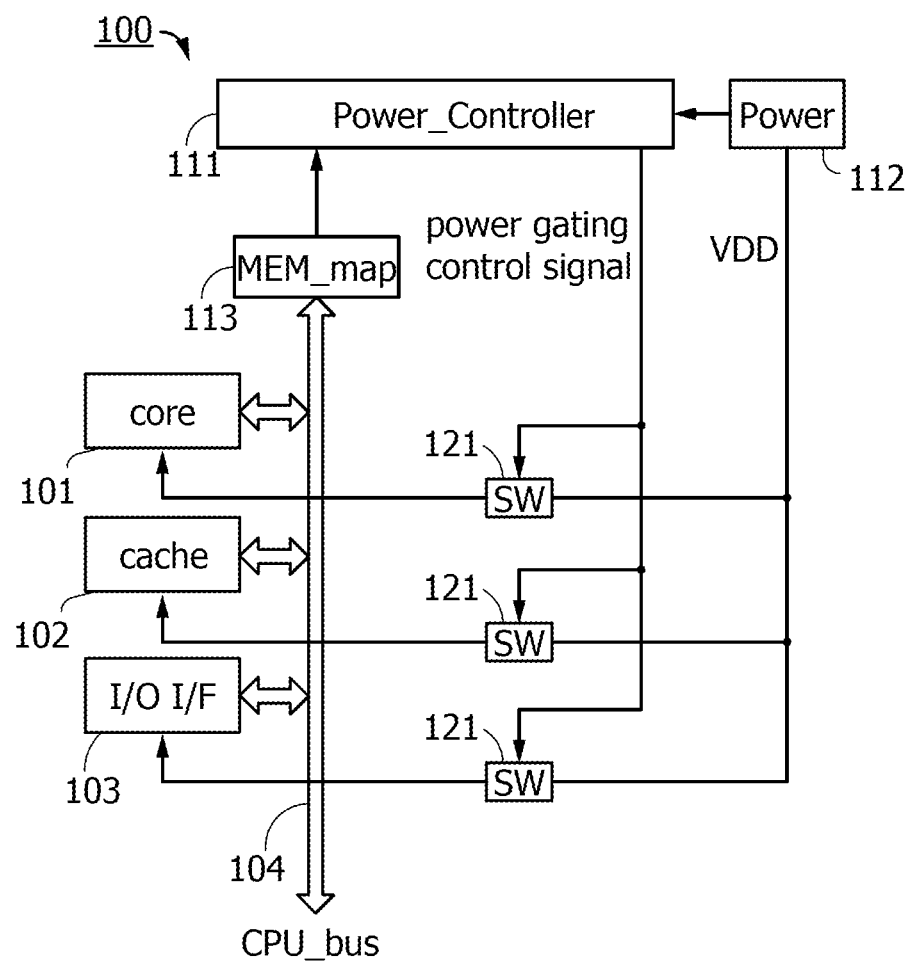
FIG. 1 is a block diagram illustrating one aspect of a semiconductor device.

Embodiments will be described below with reference to the drawings. Note that the embodiments can be implemented in various different ways and it will be readily appreciated by those skilled in the art that modes and details of the present invention can be modified in various ways without departing from the spirit and scope of the present invention. The present invention therefore should not be construed as being limited to the following description of the embodiments. Note that in structures of the invention described below, reference numerals denoting the same portions are used in common in different drawings.

In the drawings, the size, the layer thickness, or the region is exaggerated for clarity in some cases. Thus, embodiments of the present invention are not limited to such scales. Note that the drawings are schematic views showing ideal examples, and embodiments of the present invention are not limited to shapes or values shown in the drawings. For example, the following can be included: variation in signal, voltage, or current due to noise or difference in timing.

In this specification and the like, a transistor is an element having at least three terminals: a gate (a gate terminal or a gate electrode), a drain, and a source. The transistor includes a channel region between the drain (a drain terminal, a drain region, or a drain electrode) and the source (a source terminal, a source region, or a source electrode) and current can flow through the drain, the channel region, and the source.

Here, since the source and the drain of the transistor change depending on the structure, the operating condition, and the like of the transistor, it is difficult to define which is a source or a drain. Thus, a region that functions as a source or a region that functions as a drain is not referred to as a source or a drain in some cases. In that case, one of the source and the drain might be referred to as a first electrode, and the other of the source and the drain might be referred to as a second electrode.

Note that in this specification, ordinal numbers such as "first", "second", and "third" are used to avoid confusion among components, and thus do not limit the number of the components.

Note that in this specification, the expression "A and B are connected" means the case where "A and B are electrically connected" in addition to the case where "A and B are directly connected". Here, the expression "A and B are electrically connected" means the case where electric signals can be transmitted and received between A and B when an object having any electric action exists between A and B.

Note that in this specification, terms for describing arrangement, such as "over" and "under", are used for convenience for describing the positional relationship between components with reference to drawings. Further, the positional relationship between components is changed as appropriate in accordance with a direction in which each component is described. Thus, there is no limitation on terms used in this specification, and description can be made appropriately depending on the situation.

Note that the positional relationships of circuit blocks in block diagrams are specified for description, and even in the case where different circuit blocks have different functions, the different circuit blocks might be provided in an actual circuit or an actual region so that different functions are achieved in the same circuit or the same region. The functions of circuit blocks in block diagrams are specified for description, and even in the case where one circuit block is illustrated, blocks might be provided in an actual circuit or an actual region so that processing performed by one circuit block is performed by a plurality of circuit blocks.

In this specification, the term "parallel" indicates that an angle formed between two straight lines is −10 to 10°, and accordingly includes the case where the angle is −5 to 5°. In addition, the term "perpendicular" indicates that an angle formed between two straight lines is 80 to 100°, and accordingly includes the case where the angle is 85 to 95°.

In this specification, the trigonal and rhombohedral crystal systems are included in the hexagonal crystal system.

Note that the embodiments will be described in the following order:

1. Embodiment 1 (basic structure)
2. Embodiment 2 (combination with clock gating)
3. Embodiment 3 (modification)
4. Embodiment 4 (cache memory)
5. Embodiment 5 (elements of semiconductor device)
6. Embodiment 6 (structure examples of electronic components of semiconductor device and electronic devices including electronic components)

Embodiment 1

In this embodiment, a structure example of a semiconductor device supplying power to each circuit efficiently by monitoring an access state or a standby state of a signal processing circuit, a cache memory, and an input/output interface in a semiconductor device and performing power gating in accordance with a state of the signal processing circuit, a state of the cache memory, and a state of the input/output interface is described.

First, an example of a block diagram of a semiconductor device is described with reference to FIG. 1.

In this specification, a semiconductor device means a device including a semiconductor element. The semiconductor device includes a driver circuit or the like for driving a circuit including a semiconductor element. Note that the semiconductor device includes a circuit or the like formed over a different substrate.

A semiconductor device 100 in FIG. 1 includes a signal processing circuit 101 (abbreviated to "core" in the diagram), a cache memory 102 (abbreviated to "cache" in the diagram), and an input/output interface 103 (abbreviated to "I/O I/F" in the diagram). These circuits are electrically connected to each other through a bus line 104 (abbreviated to "CPU_bus" in the diagram).

The semiconductor device 100 in FIG. 1 further includes a power control circuit 111 (abbreviated to "Power Controller" in the diagram), a power supply circuit 112 (abbreviated to "Power" in the diagram), and an address monitoring circuit 113 (also referred to as a "memory map" and abbreviated to "MEM_map" in the diagram).

The semiconductor device 100 in FIG. 1 further includes a power supply control switch (abbreviated to "SW" in the diagram) 121 between the power supply circuit 112 and each of the signal processing circuit 101, the cache memory 102, and the input/output interface 103.

The signal processing circuit 101 performs arithmetic processing in accordance with an input signal. Examples of the input signal include a clock signal, a signal input from the cache memory 102, and a signal input from the input/output interface 103. The signal processing circuit 101 outputs address signals to the cache memory 102 and the input/output interface 103 and sets the cache memory 102 and the input/output interface 103 in an access state. In the case where the signal processing circuit 101 does not acquire signals from the cache memory 102 and the input/output interface 103, the signal processing circuit 101 does not output address signals and sets the cache memory 102 and the input/output interface 103 in a standby state. Note that a signal processing circuit in this specification means a circuit having a function of performing signal processing in a CPU. In the case where the CPU has a single core, one signal processing circuit is provided in the semiconductor device 100. In the case where the CPU has a multi-core, a plurality of signal processing circuits are provided in the semiconductor device 100.

The cache memory 102 temporarily stores data when the signal processing circuit 101 performs arithmetic processing. Note that a cache memory in this specification means a circuit having a function of temporarily storing data on a signal or the like corresponding to a calculation result obtained by arithmetic processing of the signal processing circuit 101 to increase the data processing speed.

The input/output interface 103 converts a signal corresponding to a calculation result of the processing circuit 101 to an output signal. For example, the input/output interface 103 has a function of generating a signal for an output device. Note that an input/output interface in this specification means a circuit functioning as an interface that outputs data on a signal or the like corresponding to a calculation result obtained by the signal processing circuit 101 to an output device.

Note that examples of the output device include external memories such as a flash memory and a hard disk, and peripheral devices such as a display, a speaker, and a printer.

A data signal, an address signal, a control signal, and the like are input and output to and from each of the signal processing circuit 101, the cache memory 102, and the input/output interface 103 through a data bus, an address bus, and a control bus of the bus line 104. Note that a bus line in this specification functions as an internal bus of the semiconductor device 100. Through the bus line 104, a variety of signals are input and output between the signal processing circuit 101 and the cache memory 102 or the input/output interface 103, so that the access state or the standby state is switched.

The power control circuit 111 outputs a power gating control signal (referred to as a "power gating control signal" in the diagram) for controlling supply of power to each of the signal processing circuit 101, the cache memory 102, and the input/output interface 103. Note that a power control circuit in this specification means a circuit having a function of generating and outputting a signal for controlling power gating and/or clock gating performed on each circuit in the semiconductor device 100.

The power supply circuit 112 supplies a potential VDD for applying power supply voltage to each of the signal processing circuit 101, the cache memory 102, and the input/output interface 103. Note that a power supply circuit in this specification means a circuit having a function of generating and outputting a potential for supplying power to each circuit in the semiconductor device 100.

The address monitoring circuit 113 monitors whether the cache memory 102 or the input/output interface 103 is in an access state. The address monitoring circuit 113 can determine whether the cache memory 102 and the input/output interface 103 are in the access state or the standby state by acquiring an address signal input and output between the signal processing circuit 101 and the cache memory 102 or the input/output interface 103. Note that an address monitoring circuit in this specification means a circuit having a function of monitoring an state of each circuit in the semiconductor device 100 by acquiring an address signal input and output between the signal processing circuit 101 and the cache memory 102 or the input/output interface 103 through the bus line 104 and outputting a signal for notifying whether each circuit is in the access state or the standby state to the power control circuit 111.

Note that the address monitoring circuit 113 can monitor the state of the cache memory 102 or the state of the input/output interface 103 by using an address signal previously output from the signal processing circuit 101 as an address signal for determining the state of each circuit.

The power supply control switch 121 switches restart or stop of supply of power to each of the signal processing circuit 101, the cache memory 102, and the input/output interface 103 in response to a power gating control signal. Note that a power supply control switch in this specification means a switch having a function of switching restart or stop of supply of power to each circuit in the semiconductor device 100 in response to a power gating control signal.

In the semiconductor device 100 in FIG. 1, the address monitoring circuit 113 monitors whether the cache memory 102 and the input/output interface 103 are in the access state or the standby state and power gating is executed or stopped in accordance with the state of each circuit. Such a structure enables appropriate supply of power to each of the signal processing circuit 101, the cache memory 102, and the input/output interface 103 and reduces unnecessary power consumption. Note that to execute power gating means to stop supply of power to a circuit by turning off the power supply control switch 121. To stop power gating means to restart supply of power to a circuit by turning on the power supply control switch 121. Further, to perform power gating means to execute and stop power gating unless otherwise specified.

Next, a structure in which power gating is executed in accordance with the state of the cache memory 102 or the state of the input/output interface 103 is described. The state of each circuit can be determined depending on a plurality of possible states of the signal processing circuit 101, the cache memory 102, and the input/output interface 103. FIGS. 2A to 2D and FIGS. 3A and 3B illustrate specific examples of the plurality of possible states of the signal processing circuit 101, the cache memory 102, and the input/output interface 103.

Note that in FIGS. 2A to 2D and FIGS. 3A and 3B, bold arrows represent signal input/output, which means that address signals are input and output through the bus line 104. In FIGS. 2A to 2D and FIGS. 3A and 3B, "I" represents a state where signals are input and output between the signal processing circuit 101 and the input/output interface 103. In FIGS. 2A to 2D and FIGS. 3A and 3B, "C" represents a state where signals are input and output between the signal processing circuit 101 and the cache memory 102. In FIGS. 2A to 2D and FIGS. 3A and 3B, "ID" represents a state where a circuit is in a standby state (idle state). In FIGS. 2A to 2D and FIGS. 3A and 3B, "A" represents a state where a circuit is in an access state. In FIGS. 2A to 2D and FIGS. 3A and 3B, "PC" represents a state where the signal processing circuit 101 outputs an address signal for executing power gating to the cache memory 102. In FIGS. 2A to 2D and FIGS. 3A and 3B, "PI" represents a state where the signal processing circuit 101 outputs an address signal for executing power gating to the input/output interface 103. In FIGS. 2A to 2D and FIGS. 3A and 3B, "G" represents a state where supply of power to a circuit is stopped by power gating. In FIGS. 2A to 2D and FIGS. 3A and 3B, a cross mark represents a state where supply of power to a circuit is stopped by power gating.

Figure 2A:
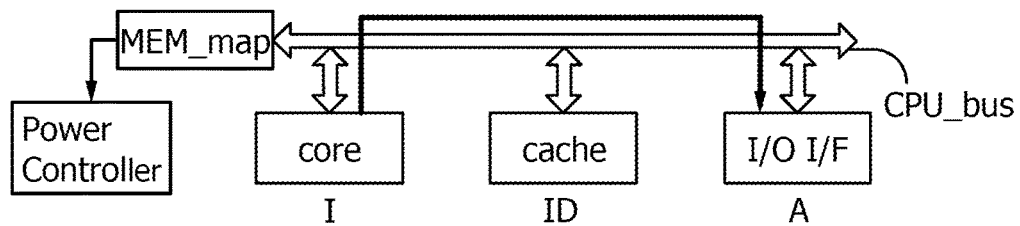
FIGS. 2A to 2D are block diagrams illustrating one aspect of a semiconductor device.

First, FIG. 2A illustrates a state where signals are input and output between the signal processing circuit 101 and the input/output interface 103. In this state, the signal processing circuit 101 is "I", the cache memory 102 is "ID", and the input/output interface 103 is "A".

Figure 2B:
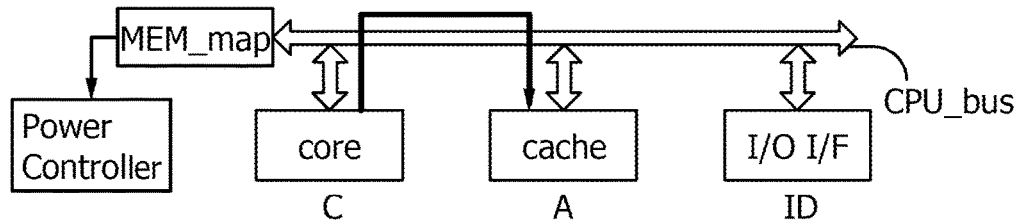

FIG. 2B illustrates a state where signals are input and output between the signal processing circuit 101 and the cache memory 102. In this state, the signal processing circuit 101 is "C", the cache memory 102 is "A", and the input/output interface 103 is "ID".

Figure 2C:
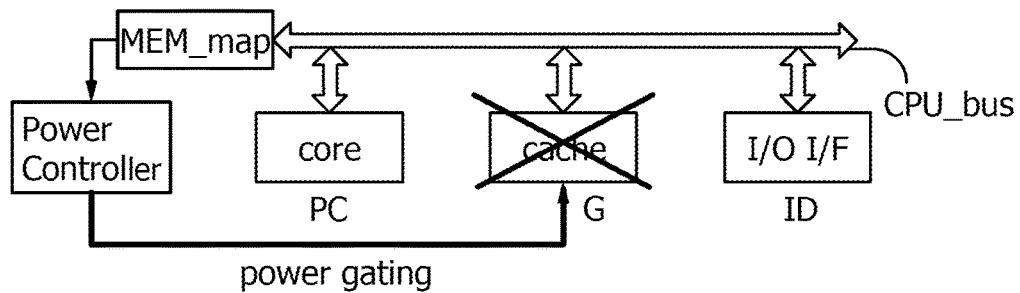

FIG. 2C illustrates a state where the signal processing circuit 101 executes power gating for stopping supply of power to the cache memory 102. In this state, the signal processing circuit 101 is "PC", the cache memory 102 is "G", and the input/output interface 103 is "ID". The power control circuit 111 turns off the power supply control switch 121 connected to the cache memory 102 by a power gating control signal.

Figure 2D:
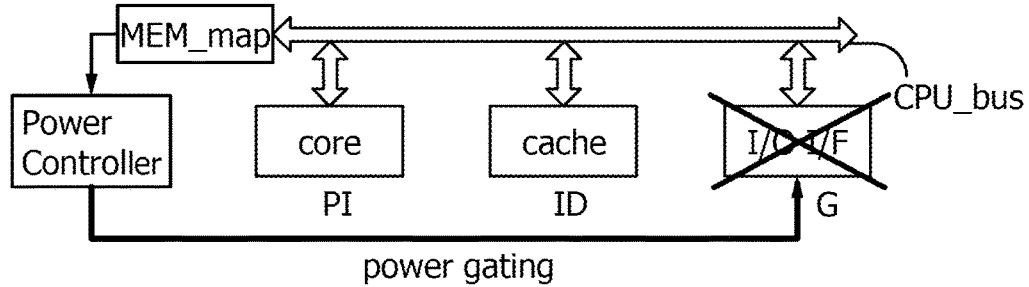

FIG. 2D illustrates a state where the signal processing circuit 101 executes power gating for stopping supply of power to the input/output interface 103. In this state, the signal processing circuit 101 is "PI", the cache memory 102 is "ID", and the input/output interface 103 is "G". The power control circuit 111 turns off the power supply control switch 121 connected to the input/output interface 103 by a power gating control signal.

Figure 3A:
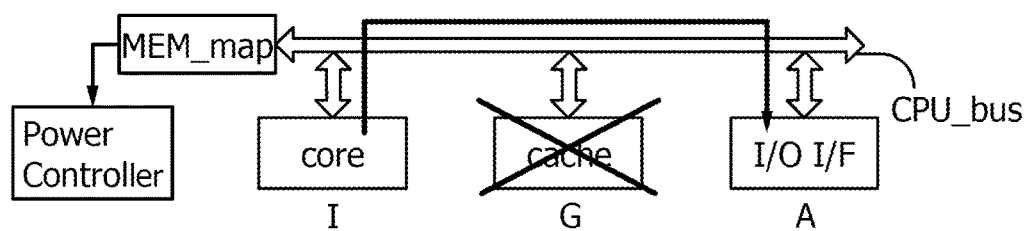
FIGS. 3A and 3B are block diagrams illustrating one aspect of a semiconductor device.

FIG. 3A illustrates a state where signals are input and output between the signal processing circuit 101 and the input/output interface 103 and the signal processing circuit 101 continues to stop the supply of power to the cache memory 102. In this state, the signal processing circuit 101 is "I", the cache memory 102 is "G", and the input/output interface 103 is "A". The power control circuit 111 turns off the power supply control switch 121 connected to the cache memory 102 by a power gating control signal.

Figure 3B:
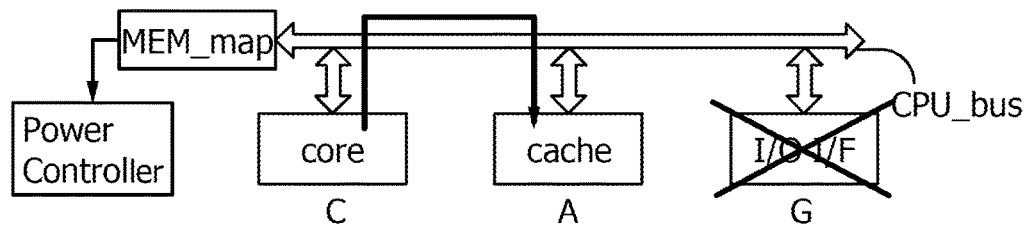

FIG. 3B illustrates a state where signals are input and output between the signal processing circuit 101 and the cache memory 102 and the signal processing circuit 101 continues to stop the supply of power to the input/output interface 103. In this state, the signal processing circuit 101 is "C", the cache memory 102 is "A", and the input/output interface 103 is "G". The power control circuit 111 turns off the power supply control switch 121 connected to the input/output interface 103 by a power gating control signal.

The plurality of possible states of the signal processing circuit 101, the cache memory 102, and the input/output interface 103 in FIGS. 2A to 2D and FIGS. 3A and 3B are monitored by the address monitoring circuit 113 and used for switching of power gating in the semiconductor device 100. In this embodiment, switching of power gating is specifically described by giving examples of transition between the plurality of possible states of the signal processing circuit 101, the cache memory 102, and the input/output interface 103.

Figure 4:
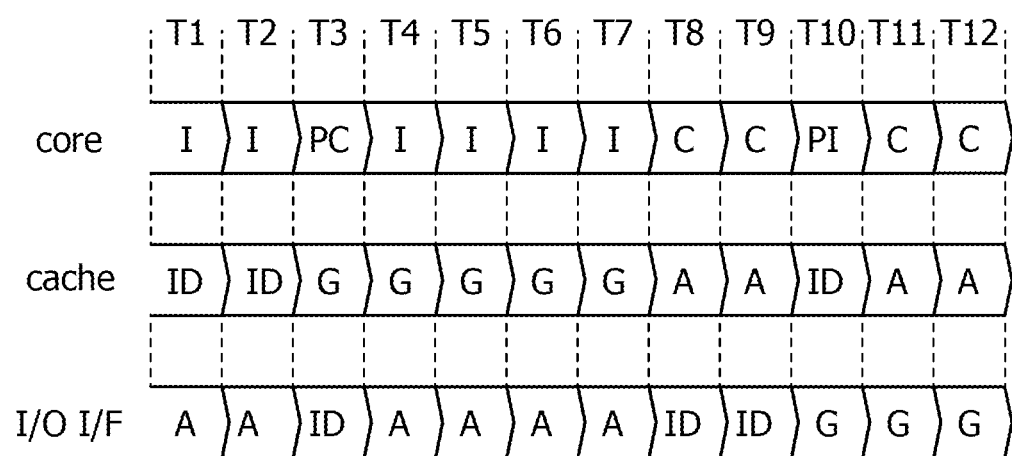
FIG. 4 is an operation schematic view illustrating one aspect of a semiconductor device.

FIG. 4 illustrates examples of transition between the plurality of possible states of the signal processing circuit 101, the cache memory 102, and the input/output interface 103 in the semiconductor device 100. FIG. 4 illustrates the states in periods T1 to T12, and switching of power gating in accordance with the state in each period is described below.

First, each circuit in the period T1 is in the same state as that in FIG. 2A.

Then, each circuit in the period T2 is in the same state as that in FIG. 2A.

Next, in the period T3, the cache memory 102 is in the standby state as in the periods T1 and T2. Thus, to stop the supply of power to the cache memory 102, the power control circuit 111 executes power gating. As a result, each circuit in the period T3 is in the same state as that in FIG. 2C.

Next, in the period T4, the cache memory 102 is in the state where the supply of power is stopped as in the period T3 and the input/output interface 103 is in the access state. Thus, the power control circuit 111 continues to stop the supply of power to the cache memory 102. As a result, each circuit in the period T4 is in the same state as that in FIG. 3A. As in the period T4, each circuit in the periods T5 to T7 is in the same state as that in FIG. 3A.

Then, each circuit in the period T8 is in the same state as that in FIG. 2B. Thus, the power control circuit 111 restarts the supply of power to the cache memory 102 and sets the cache memory 102 in the access state.

Then, each circuit in the period T9 is in the same state as that in FIG. 2B.

Next, in the period T10, the input/output interface 103 is in the standby state as in the periods T8 and T9. Thus, to stop the supply of power to the input/output interface 103, the power control circuit 111 executes power gating. As a result, each circuit in the period T10 is in the same state as that in FIG. 2D.

Next, in the period T11, the input/output interface 103 is in the state where the supply of power is stopped as in the period T10 and the cache memory 102 is in the access state. Thus, the power control circuit 111 continues to stop the supply of power to the input/output interface 103. As a result, each circuit in the period T11 is in the same state as that in FIG. 3B. As in the period T11, each circuit in the period T12 is in the same state as that in FIG. 3B.

In the semiconductor device 100 in this embodiment, the address monitoring circuit 113 acquires an address signal between the signal processing circuit and the cache memory or the input/output interface and monitors the state the cache memory and the state of the input/output interface. When one of the cache memory and the input/output interface is in the standby state and the other is in the access state, power gating can be performed on the circuit that is in the standby state. Thus, the semiconductor device 100 in this embodiment can perform power gating efficiently and can reduce power consumption.

Note that it is possible to stop power gating in a manner similar to that of executing power gating. For example, it may be possible to stop power gating in the following manner: an address signal for determining the case where power gating is stopped is output to the cache memory 102 or the input/output interface 103, and the power control circuit 111 switches a power gating control signal by using the address signal as a trigger to turn on the power supply control switch 121. Alternatively, it may be possible to stop power gating in the following manner: an address signal input and output between the signal processing circuit 101 and the cache memory 102 or the input/output interface 103 is acquired, the state of the cache memory 102 or the input/output interface 103 is determined in accordance with the acquired address signal, and the power control circuit 111 switches a power gating control signal by using the determination result as a trigger to turn on the power supply control switch 121.

As described above, in the example of the semiconductor device in this embodiment, the address monitoring circuit 113 monitors the state of the circuits electrically connected to each other through the bus line 104, and power can be supplied at appropriate timing in accordance with the state of the circuits by using the power supply control switch. Further, timings of supplying power can be different from each other in the circuits. Consequently, timings of supplying power to the circuits can be optimized separately and unnecessary power consumption can be reduced.

This embodiment can be combined with any of the other embodiments as appropriate.

Embodiment 2

In this embodiment, a structure example of a semiconductor device in which power is supplied to each circuit efficiently by performing power gating described in Embodiment 1 and using a signal for controlling clock gating is described.

First, an example of a block diagram of a semiconductor device is described with reference to FIG. 5.

Figure 5:
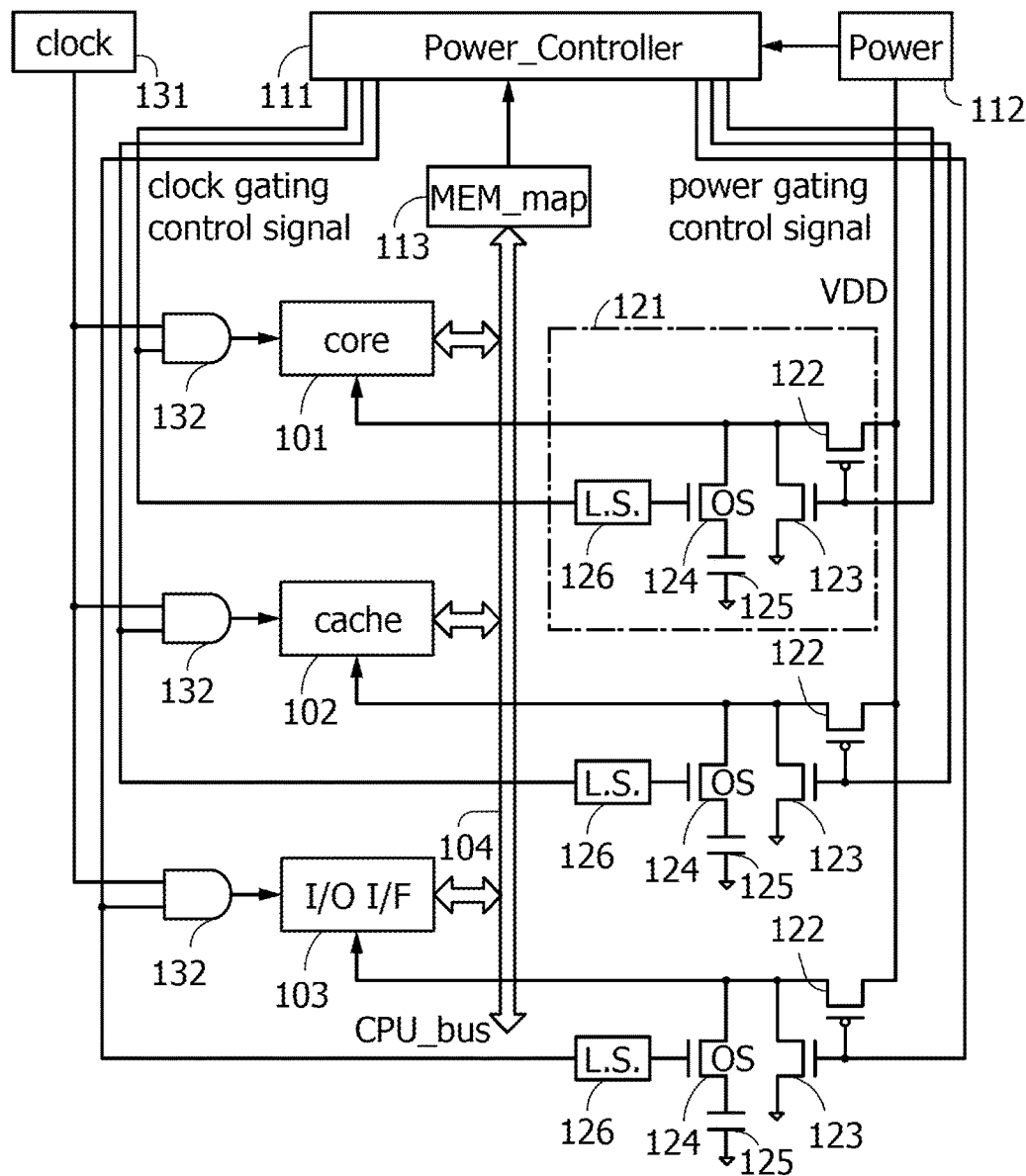
FIG. 5 is a block diagram illustrating one aspect of a semiconductor device.

The semiconductor device 100 in FIG. 5 includes the signal processing circuit 101, the cache memory 102, and the input/output interface 103. These circuits are electrically connected to each other through the bus line 104.

The semiconductor device 100 in FIG. 5 further includes the power control circuit 111, the power supply circuit 112, and the address monitoring circuit 113.

The semiconductor device 100 in FIG. 5 further includes the power supply control switch 121 between the power supply circuit 112 and each of the signal processing circuit 101, the cache memory 102, and the input/output interface 103.

The power supply control switch 121 in FIG. 5 includes a p-channel transistor 122, an n-channel transistor 123, an oxide semiconductor transistor (hereinafter referred to as an OS transistor 124), a capacitor 125, and a level shifter 126 (abbreviated to "L.S." in the diagram). Note that a wiring for supplying power is connected to a capacitor in many cases so that a potential of the wiring is held. Thus, it is possible not to add a capacitor but to use the above capacitor for holding the potential of the wiring as the capacitor 125.

In FIG. 5, "OS" is written beside the OS transistor 124 to indicate that the OS transistor 124 includes an oxide semiconductor layer.

The semiconductor device 100 in FIG. 5 includes a clock generation circuit 131. The semiconductor device 100 in FIG. 5 further includes a logic circuit 132 between the clock generation circuit 131 and each of the signal processing circuit 101, the cache memory 102, and the input/output interface 103.

The structure of the semiconductor device 100 in FIG. 5 differs from the structure in FIG. 1 described in Embodiment 1 in that the power supply control switch 121 is specifically described and the clock generation circuit 131 and the logic circuit 132 are provided. Accordingly, differences from FIG. 1 are specifically described in this embodiment, and the description in Embodiment 1 is referred to for repetitive description.

The power control circuit 111 outputs a clock gating control signal for controlling supply of a clock signal to each circuit in addition to a power gating control signal.

The p-channel transistor 122 and the n-channel transistor 123 are controlled by a power gating control signal so that one of the p-channel transistor 122 and the n-channel transistor 123 is turned on and that the other is turned off. For example, when the power gating control signal is an L-level signal, the p-channel transistor 122 is turned on and the n-channel transistor 123 is turned off, so that supply of power is restarted. When the power gating control signal is an H-level signal, the p-channel transistor 122 is turned off and the n-channel transistor 123 is turned on, so that supply of power is stopped.

Note that in FIG. 5, the power supply control switch 121 includes the p-channel transistor 122 and the n-channel transistor 123; however, another structure may be employed. For example, only the p-channel transistor 122 may be used, and the n-channel transistor 123 may be omitted.

With extremely low off-state current of the OS transistor 124, electric charge can be accumulated in the capacitor 125. Electric charge is preferably accumulated by the OS transistor 124 and the capacitor 125 immediately before stop of the supply of power and the accumulated electric charge is preferably released immediately after restart of the supply of power.

To hold a potential in a node between the OS transistor 124 and the capacitor 125 at 85° C. for 10 years ($3.15 \times 10^8$ seconds), off-state current is preferably higher than or equal to 3 yA and lower than 5 yA (yoctoamperes, where 1 yA is $10^{-24}$ A) per microfarad of capacitance and per micrometer of channel width of the transistor. In this case, the allowable potential variation in the node is preferably within 0.5 V. Alternatively, the off-state current is preferably higher than or equal to 30 and lower than 40 yA at 60° C.

The level shifter 126 is provided to raise voltage so that the on state or the off state of the OS transistor 124 can be controlled when a clock gating control signal is input to a gate of the OS transistor 124. Note that the level shifter 126 can be omitted.

The clock generation circuit 131 generates a clock signal supplied to each of the signal processing circuit 101, the cache memory 102, and the input/output interface 103. Note that a clock generation circuit in this specification means a circuit having a function of generating and outputting a clock signal supplied to each circuit in the semiconductor device 100.

The logic circuit 132 switches restart or stop of supply of a clock signal to each of the signal processing circuit 101, the cache memory 102, and the input/output interface 103 in response to a clock gating control signal. Note that for example, the logic circuit 132 can be formed using an AND circuit.

In the semiconductor device 100 in FIG. 5, the address monitoring circuit 113 monitors the state of each circuit and power gating and clock gating are performed in accordance with the state. Such a structure enables appropriate supply of power and a clock signal to each of the signal processing circuit 101, the cache memory 102, and the input/output interface 103 and reduces unnecessary power consumption.

Note that to execute clock gating means to stop supply of a clock signal to a circuit through the logic circuit 132. To stop clock gating means to restart supply of a clock signal to a circuit through the logic circuit 132. Further, to perform clock gating means to execute and stop clock gating unless otherwise specified.

Figure 6A:
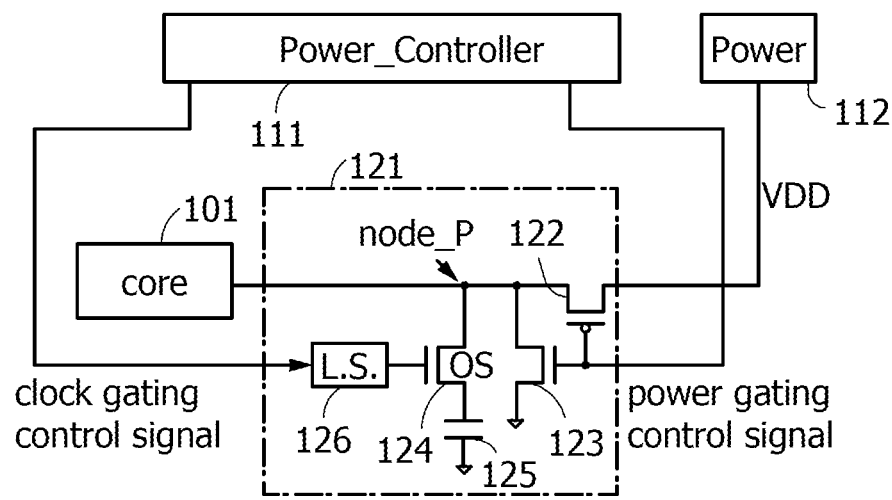
FIGS. 6A and 6B are a block diagram and a timing chart each illustrating one aspect of a semiconductor device.
Figure 6B:
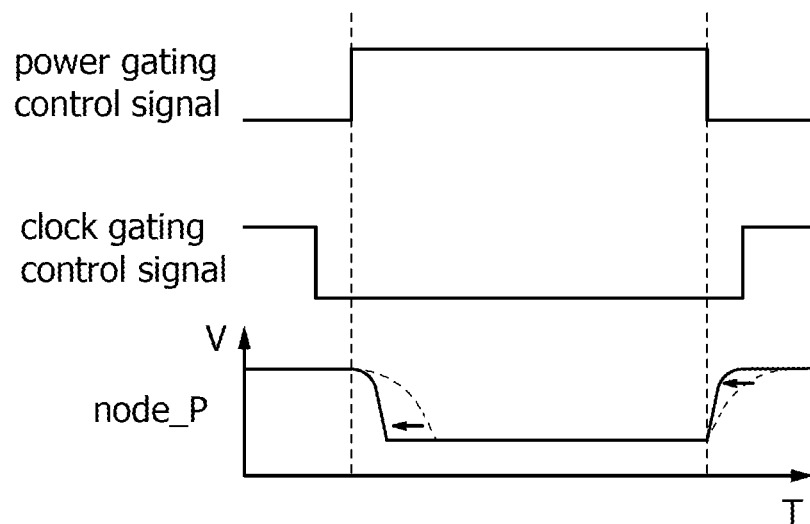

The following illustrates operation using the circuits in the power supply control switch 121 in FIG. 5 with reference to FIGS. 6A and 6B. FIG. 6A illustrates the structure of the power supply control switch 121 in FIG. 5 and an excerpt of its peripheral circuit structure.

In the structure of the power supply control switch 121 in FIG. 6A, supply of a clock signal is preferably stopped immediately before supply of power is stopped. In the structure of FIG. 6A, the supply of a clock signal is preferably restarted immediately after the supply of power is restarted. In other words, in the structure of FIG. 6A, electric charge is accumulated in the capacitor 125 by turning off the OS transistor 124 immediately before the supply of power is stopped, and the electric charge is released from the capacitor 125 by turning on the OS transistor 124 immediately after the supply of power is restarted. Note that in FIG. 6A, for illustrative purposes, a node of a wiring to which the OS transistor 124 and the signal processing circuit 101 are electrically connected is referred to as a node_P.

FIG. 6B illustrates a timing chart of a clock gating control signal, a power gating control signal, and the potential of the node_P that corresponds to the above description. As illustrated in FIG. 6B, electric charge is held in the capacitor 125 by changing the clock gating control signal from an H level into an L level to turn off the OS transistor 124 immediately before the supply of power is stopped by the power gating control signal. The electric charge is released from the capacitor 125 by changing the clock gating control signal from an L level into an H level to turn on the OS transistor 124 immediately after the supply of power is restarted by the power gating control signal.

By performing power gating, a wiring including the node_P is charged and discharged. Thus, there is a possibility that the power consumption in the case of performing power gating is higher than that in the case of not performing power gating. Power for this power gating is referred to as overhead power. Power gating is performed to reduce power consumption; therefore, it is preferable to decrease overhead power and reduce unnecessary power consumption. In particular, it is important to decrease overhead power in the structure of this embodiment where power gating is frequently performed.

Note that the capacitor 125 may be divided into a plurality of parts. That is, each of the plurality of parts may be connected to the node_P through a source and a drain of one of a plurality of OS transistors.

In the structure of this embodiment, electric charge of a wiring to which power is supplied is accumulated in advance and power gating is executed. Thus, as indicated by an arrow in FIG. 6B, a potential is decreased sharply when power gating is executed. Further, in the structure of this embodiment, power gating is stopped, and then the accumulated electric charge is released. Accordingly, since the amount of electric charge accumulated in the wiring is small, a potential is increased sharply when the supply of power is restarted as indicated by an arrow in FIG. 6B. Consequently, overhead power due to power gating can be reduced.

As described above, in addition to the effect described in Embodiment 1, overhead power due to power gating can be reduced.

This embodiment can be combined with any of the other embodiments as appropriate.

Embodiment 3

In this embodiment, a structure example of a semiconductor device is described in which power gating is performed on each of the signal processing circuit 101, the cache memory 102, and the input/output interface 103 described in Embodiment 1 and a sub-signal processing circuit 105 (abbreviated to "co-processor" in the diagram) is provided.

First, an example of a block diagram of a semiconductor device is described with reference to FIG. 7.

Figure 7:
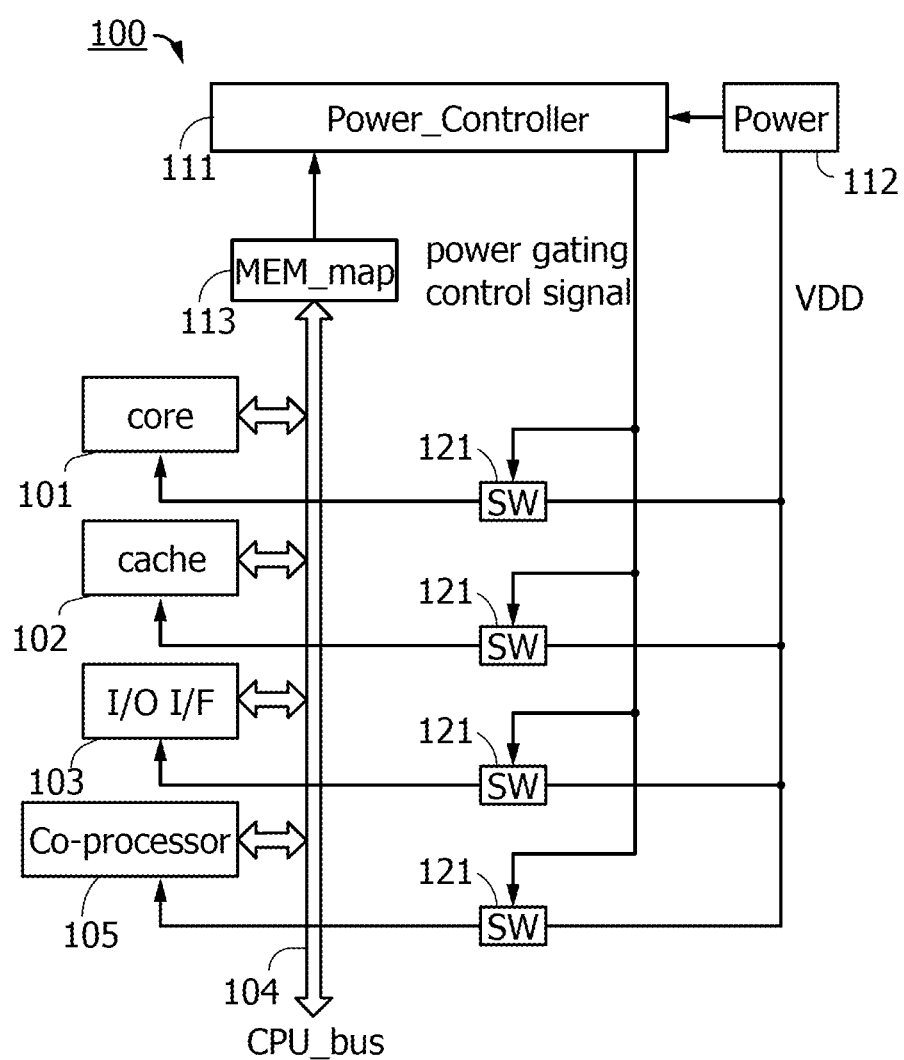
FIG. 7 is a block diagram illustrating one aspect of a semiconductor device.

The semiconductor device 100 in FIG. 7 includes the signal processing circuit 101, the cache memory 102, the input/output interface 103, and the sub-signal processing circuit 105. These circuits are electrically connected to each other through the bus line 104.

The semiconductor device 100 in FIG. 7 further includes the power control circuit 111, the power supply circuit 112, and the address monitoring circuit 113.

The semiconductor device 100 in FIG. 7 further includes the power supply control switch 121 between the power supply circuit 112 and each of the signal processing circuit 101, the cache memory 102, the input/output interface 103, and the sub-signal processing circuit 105.

The structure of the semiconductor device 100 in FIG. 7 differs from the structures in FIG. 1 and FIG. 5 described in Embodiments 1 and 2 in that the sub-signal processing circuit 105 is provided. Accordingly, differences from FIG. 1 and FIG. 5 are specifically described in this embodiment, and the description in Embodiments 1 and 2 is referred to for repetitive description.

The sub-signal processing circuit 105 performs data transfer such as loop handling in which data load and data store are repeated. Note that a sub-signal processing circuit in this specification means a circuit having a function of performing data transfer such as loop handling.

In the semiconductor device 100 in FIG. 7, the address monitoring circuit 113 monitors whether the signal processing circuit 101, the cache memory 102, the input/output interface 103, and the sub-signal processing circuit 105 are in the access state or the standby state, and power gating is performed in accordance with the state of each circuit. Such a structure enables appropriate supply of power and a clock signal to each of the signal processing circuit 101, the cache memory 102, the input/output interface 103, and the sub-signal processing circuit 105 and reduces unnecessary power consumption.

Figure 8A:
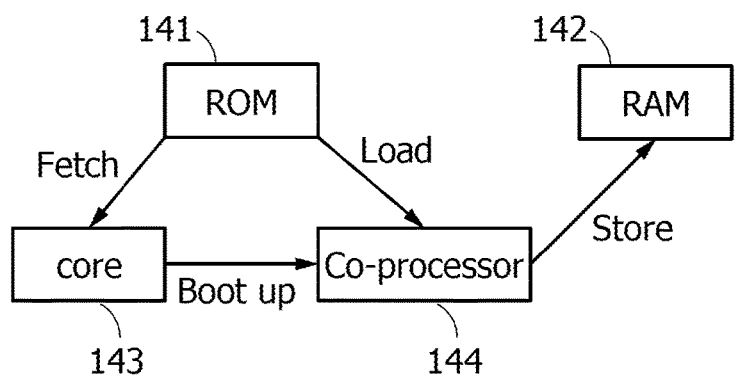
FIGS. 8A and 8B are a block diagram and an operation schematic view each illustrating one aspect of a semiconductor device.
Figure 8B:
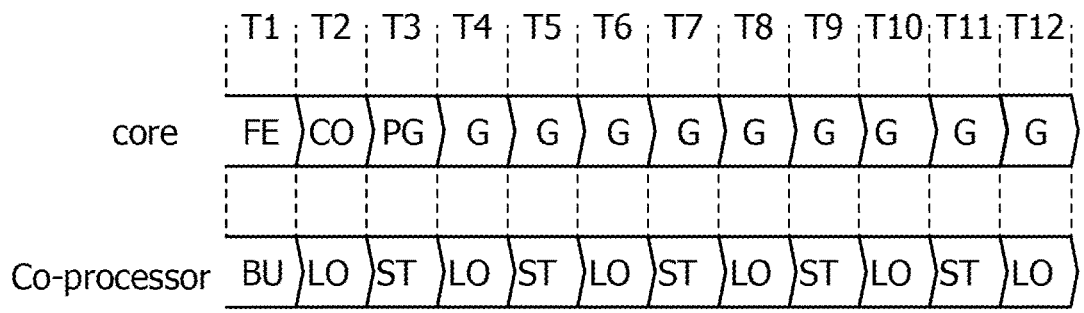

The following illustrates operation using the sub-signal processing circuit 105 in FIG. 7 with reference to FIGS. 8A and 8B. FIG. 8A is a block diagram of an external memory 141 (abbreviated to "ROM" in the diagram), an internal memory 142 (abbreviated to "RAM" in the diagram), a signal processing circuit 143, and a sub-signal processing circuit 144.

The external memory 141 is a nonvolatile storage device having comparatively low read speed, such as a flash memory or a hard disk. A program fetched in the signal processing circuit 143 and data stored in the internal memory 142 are stored in the external memory 141.

The internal memory 142 is a volatile storage device having comparatively high read speed, such as a synchronous dynamic random access memory (SDRAM) or a dynamic random access memory (DRAM). Data loaded from the external memory 141 is temporarily stored in the internal memory 142 in accordance with a program fetched in the signal processing circuit 143.

The signal processing circuit 143 executes processing in accordance with a fetched program. Further, the signal processing circuit 143 boots up the sub-signal processing circuit 144 in accordance with processing based on the fetched program.

The sub-signal processing circuit 144 loads data from the external memory 141 in accordance with a program fetched in the signal processing circuit 143 and stores the data in the internal memory 142.

Note that the sub-signal processing circuit 144 is effective when a program fetched in the signal processing circuit 143 performs loop handling in which data load and data store are repeated. In that case, after the signal processing circuit 143 boots up the sub-signal processing circuit 144, supply of power supply voltage to the signal processing circuit 143 can be stopped. Even when the supply of power to the signal processing circuit 143 is stopped, the sub-signal processing circuit 144 can have higher processing speed and lower power consumption by executing repetitive operation of data store and data load.

Figure 9A:
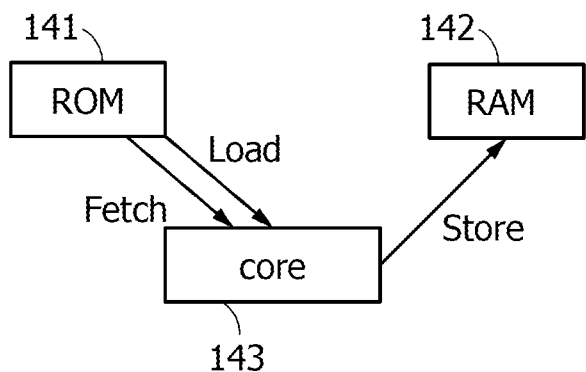
FIGS. 9A and 9B are a block diagram and an operation schematic view each illustrating one aspect of a semiconductor device.

To compare FIG. 9A to FIG. 8A, FIG. 9A illustrates a block diagram in which the sub-signal processing circuit 144 is not provided. In the case of the structure in FIG. 9A, the signal processing circuit 143 loads data from the external memory 141 in accordance with a program fetched from the external memory 141, and stores the data in the internal memory 142.

Then, operation of the signal processing circuit 143 and the sub-signal processing circuit 144 in the block diagram of FIG. 8A is described with reference to FIG. 8B. Further, operation of the signal processing circuit 143 in the block diagram of FIG. 9A is described with reference to FIG. 9B.

As described above, in the structure in the block diagram of FIG. 8A, by providing the signal processing circuit 143 and the sub-signal processing circuit 144, the supply of power supply voltage to the signal processing circuit 143 can be stopped when repetitive processing such as loop handling is performed. On the other hand, in the structure in the block diagram of FIG. 9A, the sub-signal processing circuit 144 is not provided and only the signal processing circuit 143 is provided. In that case, the supply of power supply voltage to the signal processing circuit 143 cannot be stopped when repetitive processing such as loop handling is performed.

Figure 9B:
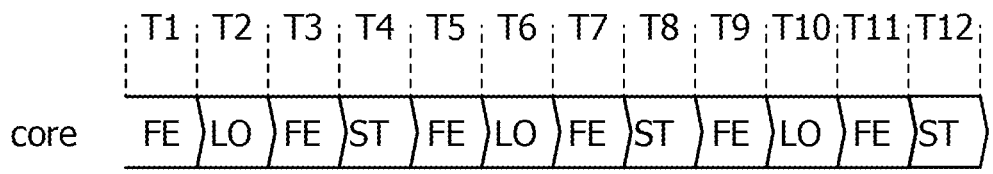

Note that in FIG. 8B and FIG. 9B, "FE" represents a state where the signal processing circuit 143 fetches in a program. In FIG. 8B and FIG. 9B, "LO" represents a state where a circuit loads data. In FIG. 8B and FIG. 9B, "ST" represents a state where a circuit stores data. In FIG. 8B, "CO" represents a state where the signal processing circuit 143 decodes a program and boots up the sub-signal processing circuit 144. In FIG. 8B, "BU" represents a state where the signal processing circuit 143 boots up the sub-signal processing circuit 144. In FIG. 8B, "PG" represents a state where power gating of the signal processing circuit 143 is executed. In FIG. 8B, "G" represents a state where supply of power to a circuit is stopped by power gating.

In the structure in the block diagram of FIG. 8A, the signal processing circuit 143 and the sub-signal processing circuit 144 are provided. Thus, the supply of power supply voltage to the signal processing circuit 143 can be stopped when the sub-signal processing circuit 144 performs repetitive processing such as loop handling as shown in periods T4 to T12 in FIG. 8B.

On the other hand, in the structure in the block diagram of FIG. 9A, the sub-signal processing circuit 144 is not provided and only the signal processing circuit 143 is provided. Thus, the supply of power supply voltage to the signal processing circuit 143 cannot be stopped when repetitive processing such as loop handling is performed as shown in periods T1 to T12 in FIG. 9B. Consequently, by providing the sub-signal processing circuit 144 when repetitive processing such as loop handling is performed, power consumption can be further reduced.

As described above, in addition to the effect described in Embodiment 1, by providing a sub-signal processing circuit, power consumption can be reduced when supply of power supply voltage to a signal processing circuit is stopped.

This embodiment can be combined with any of the other embodiments as appropriate.

Embodiment 4

In this embodiment, circuits of a semiconductor device according to one embodiment of the disclosed invention are described with reference to drawings.

A register included in a signal processing circuit of a semiconductor device can be formed using, for example, a volatile register and a nonvolatile register.

With such a structure, data can be backed up from the volatile register to the nonvolatile register immediately before power gating is executed. Further, immediately after supply of power is restarted, data stored in the nonvolatile register can be input to the volatile register. Thus, driving of the signal processing circuit can be quickly restarted.

The nonvolatile register is formed using, for example, a transistor with low off-state current. In this case, the transistor with low off-state current has a function of controlling writing and retaining of data in the nonvolatile register.

As the transistor with low off-state current, for example, a field-effect transistor including a semiconductor layer formed using an oxide semiconductor film can be used. The field-effect transistor containing an oxide semiconductor can have low off-state current in such a manner, for example, that impurities such as hydrogen or water are reduced as much as possible and oxygen vacancies are reduced as much as possible by supply of oxygen.

The nonvolatile register formed using the transistor with low off-state current can retain data for a long time simply by turning off the transistor. As a result, the nonvolatile register can be formed with a simple structure.

As in the case of the register, a volatile storage portion and a nonvolatile storage portion in a cache memory of the semiconductor device can be formed using the transistor with low off-state current.

The cache memory has a function of controlling writing and retaining of data in a memory cell by using a transistor with low off-state current. The cache memory can retain data for a long time even when supply of power is stopped. A nonvolatile storage portion formed using a transistor with low off-state current can write and read data by turning on or off the transistor; thus, the data can be input and output at high speed. Thus, driving of the cache memory can be quickly restarted.

A structure in which a nonvolatile storage portion is provided using a transistor with low off-state current is described below with reference to FIGS. 10A and 10B by giving an example of a cache memory.

Figure 10A:
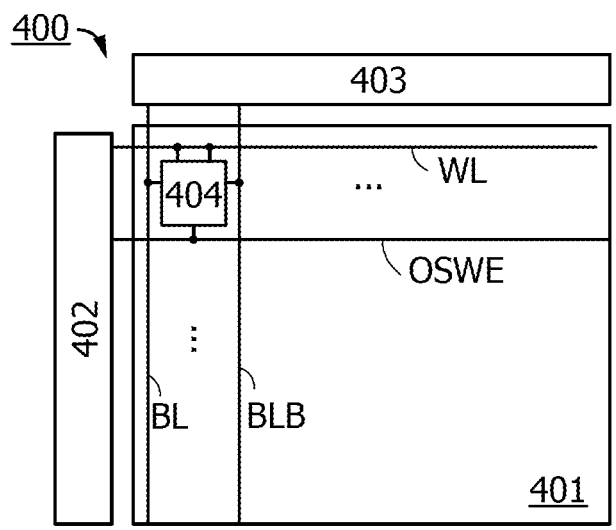
FIGS. 10A and 10B are circuit diagrams illustrating one aspect of a semiconductor device.

FIG. 10A illustrates a cache memory 400. The cache memory 400 in FIG. 10A includes a storage portion 401, a word line driver circuit 402, and a bit line driver circuit 403. In the storage portion 401, storage circuits 404 are arranged in matrix.

The word line driver circuit 402 and the bit line driver circuit 403 control supply of signals to the storage circuits 404 and acquire signals from the storage circuits 404 during data reading.

The word line driver circuit 402 is electrically connected to the storage circuit 404 through a word line WL and a write control line OSWE. The bit line driver circuit 403 is electrically connected to the storage circuit 404 through a bit line BL and an inversion bit line BLB.

Figure 10B:
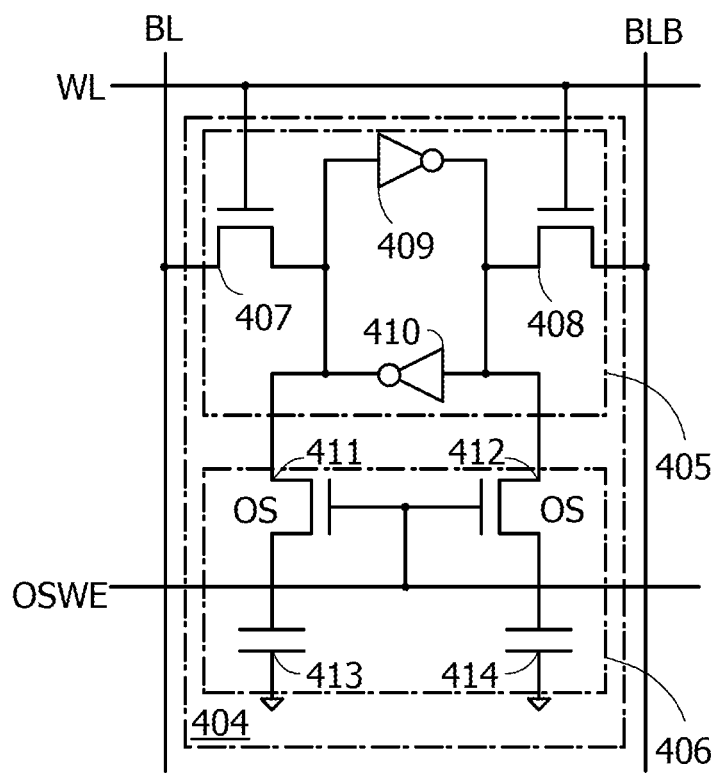

FIG. 10B illustrates the storage circuit 404. The storage circuit 404 includes a volatile storage portion 405 and a nonvolatile storage portion 406.

The volatile storage portion 405 includes a transistor 407, a transistor 408, an inverter 409, and an inverter 410.

With the above structure, the volatile storage portion 405 constitutes a static random access memory (SRAM). The SRAM can read and write data at high speed.

The nonvolatile storage portion 406 includes a transistor 411, a transistor 412, a capacitor 413, and a capacitor 414.

The transistor 411 and the transistor 412 have extremely low off-state current. When the transistor 411 and the transistor 412 have extremely low off-state current, electric charge is held in the capacitor 413 and the capacitor 414 for a long time.

Here, an oxide semiconductor film used for a semiconductor layer of an OS transistor that can be used as each of the transistor 411 and the transistor 412 with extremely low off-state current is described in detail.

An oxide semiconductor film is roughly classified into a single-crystal oxide semiconductor film and a non-single-crystal oxide semiconductor film. The non-single-crystal oxide semiconductor film means any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example of the amorphous oxide semiconductor film is an oxide semiconductor film in which no crystal part exists even in a microscopic region, and the whole of the film is amorphous.

The microcrystalline oxide semiconductor film includes a microcrystal (also referred to as nanocrystal) of greater than or equal to 1 nm and less than 10 nm, for example. Thus, the microcrystalline oxide semiconductor film has higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit into a cube whose one side is less than 100 nm. Thus, there is a case where a crystal part included in the CAAC-OS film fits into a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction substantially parallel to a sample surface (cross-sectional TEM image), metal atoms are arranged in a layered manner in the crystal parts. Each metal atom layer has a morphology reflected by a surface over which the CAAC-OS film is formed (hereinafter, a surface over which the CAAC-OS film is formed is referred to as a formation surface) or a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (planar TEM image), metal atoms are arranged in a triangular or hexagonal configuration in the crystal parts. However, there is no regularity of arrangement of metal atoms between different crystal parts.

From the results of the cross-sectional TEM image and the planar TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle ($2\theta$) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

On the other hand, when the CAAC-OS film is analyzed by an in-plane method in which an X-ray enters a sample in a direction substantially perpendicular to the c-axis, a peak appears frequently when $2\theta$ is around 56°. This peak is derived from the (110) plane of the $InGaZnO_4$ crystal. Here, analysis ($\varphi$ scan) is performed under conditions where the sample is rotated around a normal vector of a sample surface as an axis ($\varphi$ axis) with $2\theta$ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when $\theta$ scan is performed with $2\theta$ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer which is arranged in a layered manner and observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where the shape of the CAAC-OS film is changed by etching or the like, the c-axis might not be necessarily parallel to a normal vector of a formation surface or a normal vector of a top surface of the CAAC-OS film.

Further, the crystallinity in the CAAC-OS film is not necessarily uniform. For example, in the case where crystal growth leading to the CAAC-OS film occurs from the vicinity of the top surface of the film, the crystallinity in the vicinity of the top surface is higher than that in the vicinity of the formation surface in some cases. Further, when an impurity is added to the CAAC-OS film, the crystallinity in a region to which the impurity is added is changed, and the crystallinity in the CAAC-OS film varies depending on regions.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor including the CAAC-OS film, changes in electrical characteristics of the transistor due to irradiation with visible light or ultraviolet light are small. Thus, the transistor has high reliability.

Note that the oxide semiconductor film may be a stacked film including two or more films of an amorphous oxide semiconductor film, a microcrystalline oxide semiconductor film, and a CAAC-OS film, for example.

The above is the description of the oxide semiconductor used for the semiconductor layer of the OS transistor.

The volatile storage portion 405 and the nonvolatile storage portion 406 are electrically connected to each other. Thus, immediately before power gating is executed, data in the volatile storage portion 405 can be backed up to a data retention portion of the nonvolatile storage portion 406 in response to a signal of the write control line OSWE.

The volatile storage portion 405 is an SRAM, and thus needs to operate at high speed. On the other hand, the nonvolatile storage portion 406 needs to retain data for a long time after supply of power is stopped. Such a structure can be achieved by, for example, forming the volatile storage portion 405 using a single crystal silicon substrate and forming the nonvolatile storage portion 406 using an oxide semiconductor film.

As described above, the cache memory 400 can be operated with high reliability. Further, data can be recovered reliably even when the SRAM is turned off, and data is backed up only to some of the storage elements, leading to a reduction in power consumption.

Note that in this embodiment, an SRAM is used as the volatile memory; however, one embodiment of the disclosed invention is not limited thereto, and other volatile memories may be used.

This embodiment can be combined with any of the other embodiments as appropriate.

Embodiment 5

In this embodiment, a cross-sectional structure of elements included in a semiconductor device according to one embodiment of the disclosed invention, specifically, a cross-sectional structure of elements included in a cache memory is described with reference to FIG. 11.

Figure 11:
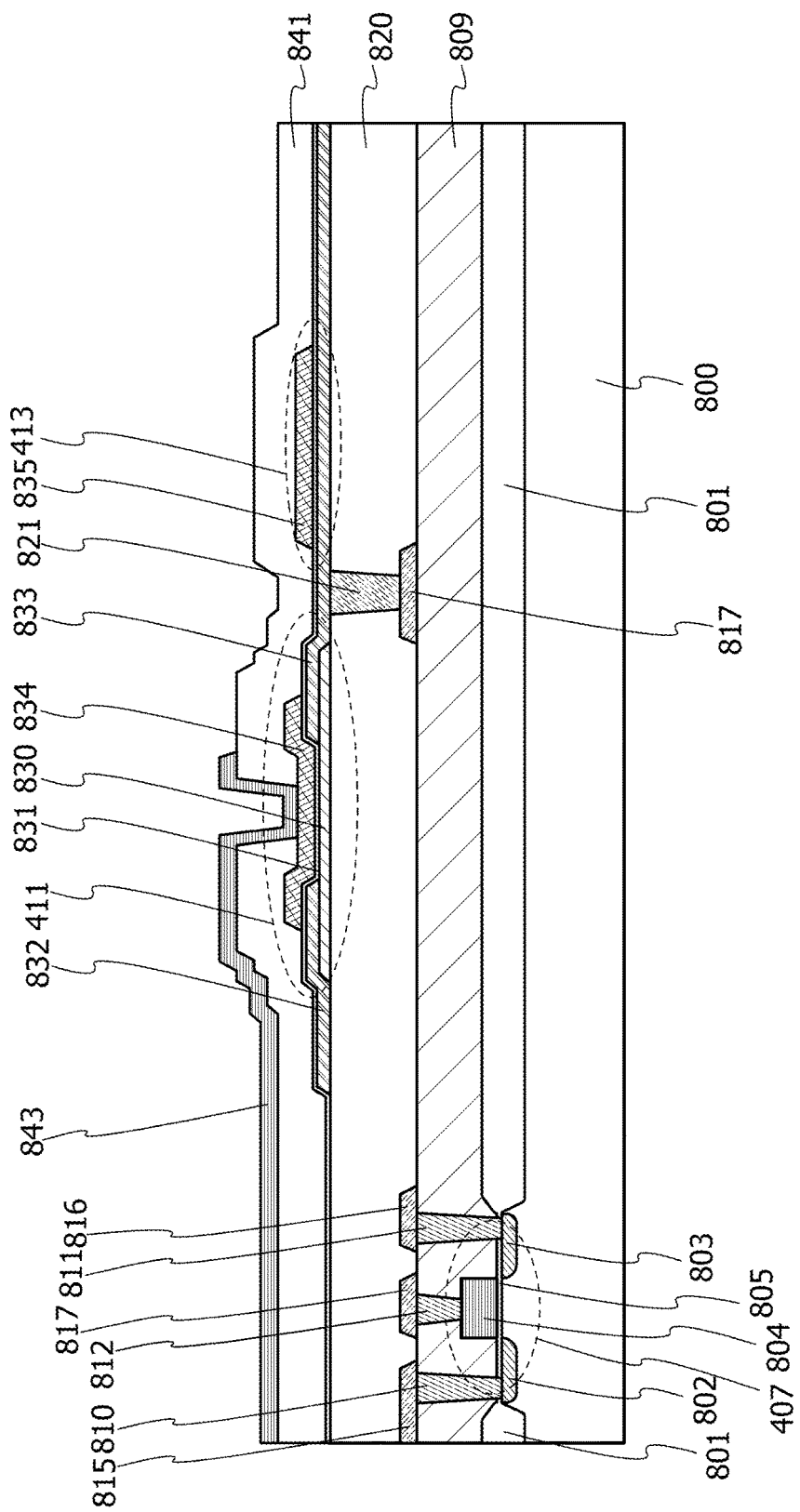
FIG. 11 is a cross-sectional schematic view illustrating one aspect of a semiconductor device.

FIG. 11 illustrates an example of part of a cross-sectional structure of a semiconductor device according to one embodiment of the disclosed invention. Note that FIG. 11 illustrates the transistor 411, the capacitor 413, and the transistor 407 described in Embodiment 4.

In this embodiment, the transistor 407 is formed in a single crystal silicon substrate, and the transistor 411 including an active layer containing an oxide semiconductor is formed above the transistor 407. The transistor 407 may include a semiconductor thin film of silicon, germanium, or the like in an amorphous, microcrystalline, polycrystalline, or signal crystal state as an active layer. Alternatively, the transistor 407 may include an active layer containing an oxide semiconductor. In the case where the transistors each include an active layer containing an oxide semiconductor, the transistor 411 is not necessarily stacked above the transistor 407, and the transistors 411 and 407 may be formed in the same layer.

In the case where the transistor 407 is formed using a thin silicon film, any of the following can be used: amorphous silicon formed by sputtering or vapor phase growth such as plasma-enhanced CVD; polycrystalline silicon obtained by crystallization of amorphous silicon by treatment such as laser annealing; single crystal silicon obtained by separation of a surface portion of a single crystal silicon wafer by implantation of hydrogen ions or the like into the silicon wafer; and the like.

Note that in the case where, among transistors included in the storage circuit 404 described in Embodiment 4, the transistor 411 and the transistor 412 contain an oxide semiconductor and the other transistors including the transistor 407 contain silicon, the number of transistors containing an oxide semiconductor is smaller than that of transistors containing silicon. As a result, the design rule of the transistor 411 and the transistor 412 can be relaxed by stacking the transistor 411 and the transistor 412 over a transistor containing silicon.

The chip area of a CPU can be reduced with the use of such a register in which a transistor containing silicon and a transistor containing an oxide semiconductor are stacked. Since the number of transistors containing silicon is larger than that of transistors containing an oxide semiconductor in one circuit block, the actual chip area of the CPU depends on the number of transistors containing silicon.

In FIG. 11, the n-channel transistor 407 is formed in a semiconductor substrate 800.

The semiconductor substrate 800 can be, for example, an n-type or p-type silicon substrate, germanium substrate, silicon germanium substrate, or compound semiconductor substrate (e.g., GaAs substrate, InP substrate, GaN substrate, SiC substrate, GaP substrate, GaInAsP substrate, or ZnSe substrate). In FIG. 11, a single crystal silicon substrate having n-type conductivity is used.

The transistor 407 is electrically isolated from another transistor by an element isolation insulating film 801. The element isolation insulating film 801 can be formed by a local oxidation of silicon (LOCOS) method, a trench isolation method, or the like.

Specifically, the transistor 407 includes impurity regions 802 and 803 that are formed in the semiconductor substrate 800 and function as a source region and a drain region, a gate electrode 804, and a gate insulating film 805 provided between the semiconductor substrate 800 and the gate electrode 804. The gate electrode 804 overlaps with a channel formation region formed between the impurity regions 802 and 803 with the gate insulating film 805 positioned between the gate electrode 804 and the channel formation region.

An insulating film 809 is provided over the transistor 407. Openings are formed in the insulating film 809. Wirings 810 and 811 that are in contact with the impurity regions 802 and 803, respectively, and a wiring 812 that is in contact with the gate electrode 804 is formed in the openings.

The wiring 810 is connected to a wiring 815 formed over the insulating film 809. The wiring 811 is connected to a wiring 816 formed over the insulating film 809. The wiring 812 is connected to a wiring 817 formed over the insulating film 809.

An insulating film 820 is formed over the wirings 815 to 817. An opening is formed in the insulating film 820. In the opening, a wiring 821 that is connected to the wiring 817 is formed.

In FIG. 11, the transistor 411 and the capacitor 413 are formed over the insulating film 820.

The transistor 411 includes, over the insulating film 820, a semiconductor film 830 containing an oxide semiconductor, conductive films 832 and 833 that are positioned over the semiconductor film 830 and function as a source electrode and a drain electrode, a gate insulating film 831 over the semiconductor film 830 and the conductive films 832 and 833, and a gate electrode 834 that is positioned over the gate insulating film 831 and overlaps with the semiconductor film 830 between the conductive films 832 and 833. Note that the conductive film 833 is connected to the wiring 821.

A conductive film 835 is provided over the gate insulating film 831 to overlap with the conductive film 833. A portion where the conductive films 833 and 835 overlap with each other with the gate insulating film 831 positioned therebetween functions as the capacitor 413.

Note that in FIG. 11, the capacitor 413 is provided over the insulating film 820 together with the transistor 411. However, the capacitor 413 may be provided below the insulating film 820 together with the transistor 407.

An insulating film 841 is provided over the transistor 411 and the capacitor 413. An opening is provided in the insulating film 841. Over the insulating film 841, a conductive film 843 that is in contact with the gate electrode 834 through the opening is provided.

Note that in FIG. 11, the transistor 411 includes the gate electrode 834 on at least one side of the semiconductor film 830. Alternatively, the transistor 411 may include a pair of gate electrodes with the semiconductor film 830 positioned therebetween.

When the transistor 411 includes a pair of gate electrodes with the semiconductor film 830 positioned therebetween, a signal for controlling an on state or an off state may be supplied to one of the gate electrodes, and the other of the gate electrodes may be supplied with a potential from another element. In the latter case, potentials at the same level may be supplied to the pair of electrodes, or a fixed potential such as a ground potential may be supplied only to the other of the gate electrodes. By controlling the level of a potential applied to the other of the gate electrodes, the threshold voltage of the transistor 411 can be controlled.

This embodiment can be combined with any of the other embodiments as appropriate.

Embodiment 6

In this embodiment, examples in which a circuit including the transistor described in the above embodiment is used in an electronic component and examples in which the circuit including the transistor described in the above embodiment is used in an electronic device including the electronic component are described with reference to FIGS. 12A and 12B and FIGS. 13A to 13E.

Figure 12A:
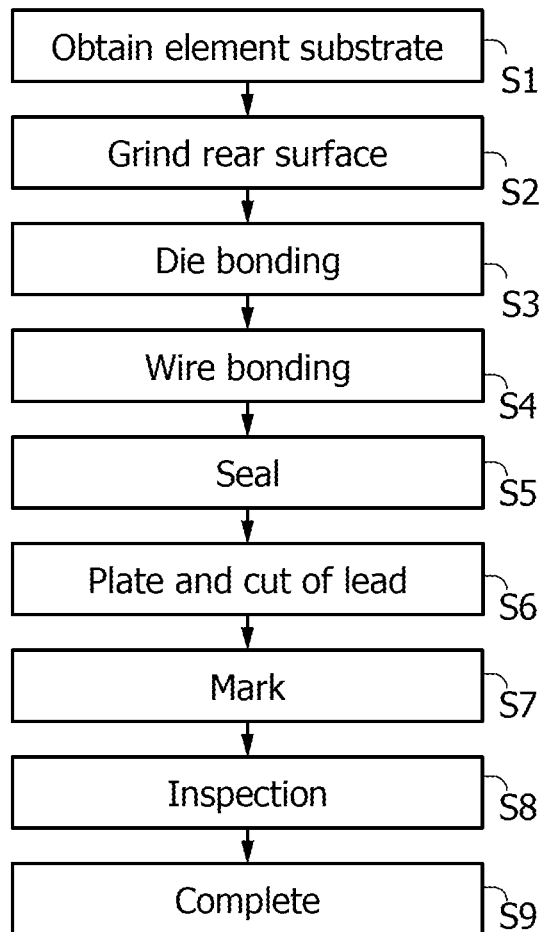
FIGS. 12A and 12B are a flow chart and a schematic perspective view each illustrating steps of manufacturing a semiconductor device.

FIG. 12A illustrates an example in which the circuit including the transistor described in the above embodiment is used in an electronic component. Note that the electronic component is also referred to as a semiconductor package or an IC package. This electronic component has a plurality of standards and names depending on a terminal extraction direction and a terminal shape. Thus, examples of the electronic component are described in this embodiment.

A semiconductor device including a cache memory having a transistor as illustrated in FIG. 11 in Embodiment 5 can be completed after an assembly process (post-process) by using a plurality of components that can be detached and attached from and to a printed wiring board in combination.

The post-process can be finished through each step in FIG. 12A. Specifically, after an element substrate obtained in the preceding process is completed (Step S1), a rear surface of the substrate is ground (Step S2). By thinning the substrate at this stage, the warpage or the like of the substrate in the preceding process is reduced and the component is downsized.

The rear surface of the substrate is ground so that the substrate is divided into a plurality of chips in a dicing process. Then, the divided chips are separately picked up to be mounted on and bonded to a lead frame in a die bonding process (Step S3). In this die bonding process, the chip is bonded to the lead frame by an appropriate method depending on a product, for example, bonding with a resin or a tape. Note that in the die bonding process, bonding between the chip and the lead frame may be conducted by mounting the chip on an interposer.

Then, wire bonding is performed to electrically connect lead of the lead frame to an electrode on the chip with a metal fine line (wire) (Step S4). A silver line or a gold line can be used as the metal fine line. Ball bonding or wedge bonding can be used as the wire bonding.

A molding process is performed to seal the wire bonded chip with an epoxy resin or the like (Step S5). With the molding process, the electronic component is filled with the resin, so that a mounted semiconductor device or wire can be protected against mechanical external force. Further, deterioration in characteristics due to moisture or dust can be reduced.

Next, plate processing is performed on the lead of the lead frame. After that, the lead is cut and processed (Step S6). This plate processing prevents rust of the lead and facilitates soldering at the time of mounting the chip on a printed wiring board in a later step.

Then, printing (marking) is performed on a surface of the package (Step S7). Through the final inspection process (Step S8), the electronic component included in the semiconductor device is completed (Step S9).

The above electronic component can be included in the semiconductor device described in the above embodiment. Thus, it is possible to obtain an electronic component with which a power supply period can be optimized in each circuit and power consumption can be reduced.

Figure 12B:
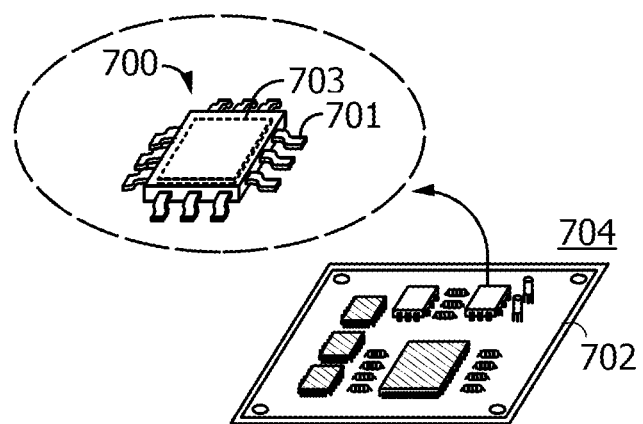

FIG. 12B is a schematic perspective view of an electronic component including the completed semiconductor device. FIG. 12B illustrates a schematic perspective view of a quad flat package (QFP) as an example of the electronic component. A lead 701 and a transistor portion 703 of an electronic component 700 are illustrated in FIG. 12B. The electronic component 700 in FIG. 12B is mounted on a printed wiring board 702, for example. The plurality of electronic components 700 are used in combination to be electrically connected to each other over the printed wiring board 702; thus, the semiconductor device is completed. A completed semiconductor device 704 is provided in an electronic device or the like.

Then, applications of the electronic component to an electronic device such as a computer, a portable information terminal (including a cellular phone, a portable game machine, an audio reproducing device, and the like), electronic paper, a television device (also referred to as a television or a television receiver), or a digital video camera are described.

Figure 13A:
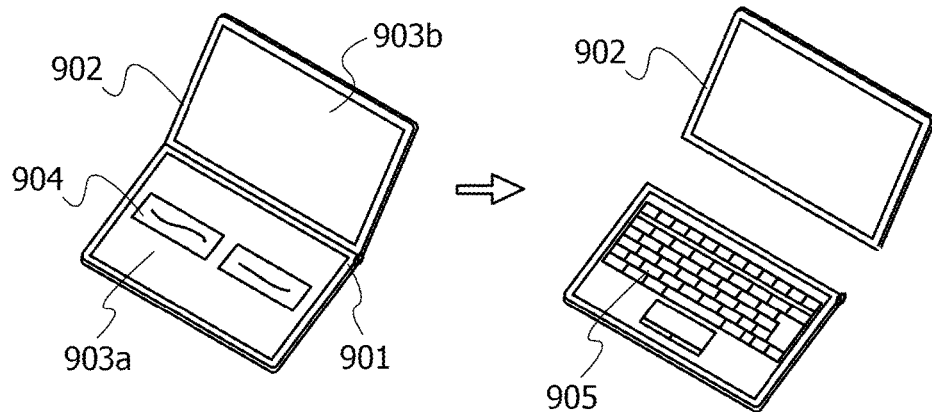
FIGS. 13A to 13E each illustrate an electronic device including a semiconductor device.

FIG. 13A illustrates a portable information terminal, which includes a housing 901, a housing 902, a first display portion 903a, a second display portion 903b, and the like. The semiconductor device described in the above embodiment is provided in at least one of the housings 901 and 902. Thus, it is possible to obtain a portable information terminal with which a power supply period can be optimized in each circuit and power consumption can be reduced.

Note that the first display portion 903a is a touch panel, and for example, as illustrated in the left of FIG. 13A, which of "touch input" and "keyboard input" is performed can be selected by a selection button 904 displayed on the first display portion 903a. Since the selection buttons with a variety of sizes can be displayed, the portable information terminal can be easily used by people of any generation. In the case where "keyboard input" is selected, for example, a keyboard 905 is displayed on the first display portion 903a as illustrated in the right of FIG. 13A. With the keyboard 905, letters can be input quickly by keyboard input as in the case of using a conventional information terminal, for example.

Further, one of the first display portion 903a and the second display portion 903b can be detached from the portable information terminal as illustrated in the right in FIG. 13A. The first display portion 903a can also function as a touch panel for a reduction in weight to carry around to be operated by one hand while the other hand supports the housing 902, which is convenient.

The portable information terminal illustrated in FIG. 13A can have a function of displaying various kinds of information (e.g., a still image, a moving image, and a text image), a function of displaying a calendar, a date, the time, or the like on the display portion, a function of operating or editing the information displayed on the display portion, a function of controlling processing by various kinds of software (programs), and the like. Further, an external connection terminal (e.g., an earphone terminal or a USB terminal), a recording medium insertion portion, and the like may be provided on the back surface or the side surface of the housing.

The portable information terminal illustrated in FIG. 13A may transmit and receive data wirelessly. Through wireless communication, desired book data or the like can be purchased and downloaded from an electronic book server.

Further, the housing 902 illustrated in FIG. 13A may have an antenna, a microphone function, or a wireless communication function to be used as a cellular phone.

Figure 13B:
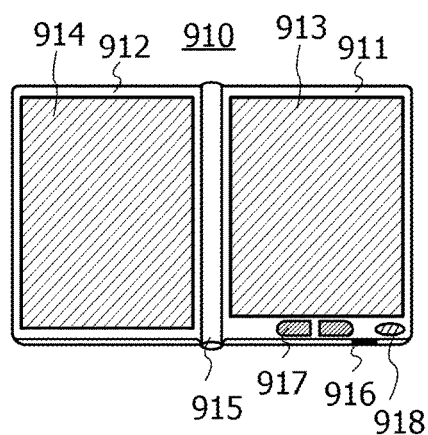

FIG. 13B illustrates an e-book reader 910 including electronic paper. The e-book reader 910 includes two housings 911 and 912. The housing 911 and the housing 912 include a display portion 913 and a display portion 914, respectively. The housings 911 and 912 are connected to each other by a hinge 915, so that the e-book reader 910 can be opened and closed using the hinge 915 as an axis. The housing 911 includes a power button 916, operation keys 917, a speaker 918, and the like. At least one of the housings 911 and 912 is provided with the semiconductor device described in the above embodiment. Thus, it is possible to obtain an e-book reader with which a power supply period can be optimized in each circuit and power consumption can be reduced.

Figure 13C:
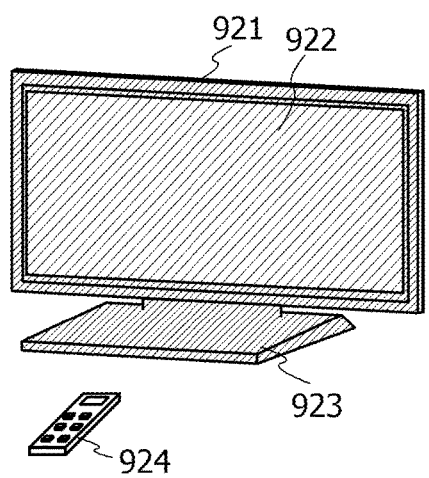

FIG. 13C is a television device, which includes a housing 921, a display portion 922, a stand 923, and the like. The television device 920 can be operated with a switch of the housing 921 and a remote control 924. The semiconductor device described in the above embodiment is mounted on the housing 921 and the remote control 924. Thus, it is possible to obtain a television device with which a power supply period can be optimized in each circuit and power consumption can be reduced.

Figure 13D:
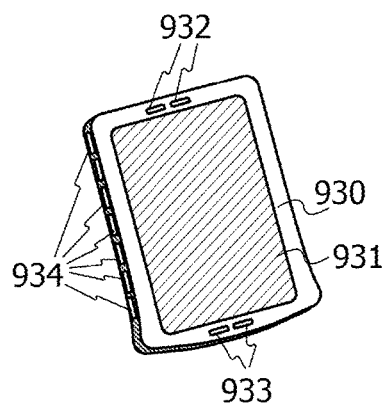

FIG. 13D illustrates a smartphone in which a main body 930 includes a display portion 931, a speaker 932, a microphone 933, operation buttons 934, and the like. The semiconductor device described in the above embodiment is provided in the main body 930. Thus, it is possible to obtain a smartphone with which a power supply period can be optimized in each circuit and power consumption can be reduced.

Figure 13E:
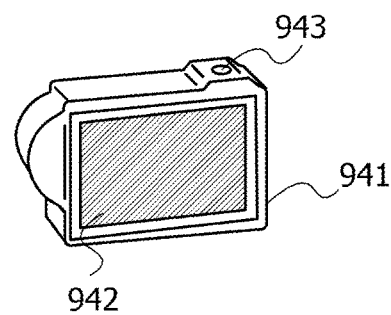

FIG. 13E illustrates a digital camera, which includes a main body 941, a display portion 942, an operation switch 943, and the like. The semiconductor device described in the above embodiment is provided in the main body 941. Thus, it is possible to obtain a digital camera with which a power supply period can be optimized in each circuit and power consumption can be reduced.

As described above, the semiconductor device described in the above embodiment is mounted on each of the electronic devices described in this embodiment. Thus, it is possible to obtain an electronic device with which a power supply period can be optimized in each circuit and power consumption can be reduced.

This application is based on Japanese Patent Application serial No. 2013-010716 filed with Japan Patent Office on Jan. 24, 2013, the entire contents of which are hereby incorporated by reference.

What is claimed is:

1. A semiconductor device comprising:
   a signal processing circuit, a cache memory, and an input/output interface electrically connected to a bus line;
   an address monitoring circuit monitoring whether the signal processing circuit, the cache memory, and the input/output interface are in an access state or not;
   first to third switches electrically connected to the signal processing circuit, the cache memory, and the input/output interface, respectively, and configured to select whether to supply power to the signal processing circuit, the cache memory, and the input/output interface in response to a power gating control signal;
   a power control circuit outputting the power gating control signal in accordance with a state of the signal processing circuit, a state of the cache memory, and a state of the input/output interface which are monitored by the address monitoring circuit;
   a node electrically connected to one of the first to third switches and one of the signal processing circuit, the cache memory, and the input/output interface;
   a transistor including an oxide semiconductor film as a semiconductor layer; and
   a capacitor electrically connected to the node through a source and a drain of the transistor, wherein the capacitor is electrically connected to the one of the signal processing circuit, the cache memory, and the input/output interface through the node.

2. The semiconductor device according to claim 1, further comprising first to third logic circuits being electrically connected to the signal processing circuit, the cache memory, and the input/output interface, respectively, and configured to select whether to supply a clock signal to the signal processing circuit, the cache memory, and the input/output interface in response to a clock gating control signal,
wherein the power control circuit is configured to output the clock gating control signal in accordance with the state of the signal processing circuit, the state of the cache memory, and the state of the input/output interface.

3. The semiconductor device according to claim 2, wherein the clock gating control signal is input to a gate of the transistor.

4. The semiconductor device according to claim 2, wherein the clock gating control signal stops supply of the clock signal before the power gating control signal is switched to stop supply of the power.

5. The semiconductor device according to claim 2, wherein the clock gating control signal restarts supply of the clock signal after the power gating control signal is switched to restart supply of the power.

6. A semiconductor device comprising:
a bus line;
a signal processing circuit;
a cache memory configured to be supplied with a first address signal from the signal processing circuit through the bus line;
an input/output interface configured to be supplied with a second address signal from the signal processing circuit through the bus line;
an address monitoring circuit acquiring the first address signal and the second address signal;
a power control circuit performing power gating on the cache memory and the input/output interface;
a power supply circuit electrically connected to the cache memory through a first node and electrically connected to the input/output interface through a second node;
a first transistor including a first oxide semiconductor film as a semiconductor layer;
a second transistor including a second oxide semiconductor film as a semiconductor layer;
a first capacitor electrically connected to the first node through a source and a drain of the first transistor; and
a second capacitor electrically connected to the second node through a source and a drain of the second transistor,
wherein switching of the first and second transistors is controlled by the power control circuit,
wherein the power control circuit is configured to select whether power gating of the cache memory is performed or not in response to the first address signal,
wherein the power control circuit is configured to select whether power gating of the input/output interface is performed or not in response to the second address signal,
wherein the first capacitor is electrically connected to the cache memory through the first node, and
wherein the second capacitor is electrically connected to the input/output interface through the second node.

7. The semiconductor device according to claim 6, further comprising:

a first switch between the power supply circuit and the first node; and
a second switch between the power supply circuit and the second node,
wherein switching of the first and second switches is controlled by the power control circuit.

8. The semiconductor device according to claim 7,
wherein the first transistor is stacked with the first switch, and
wherein the second transistor is stacked with the second switch.

9. The semiconductor device according to claim 6,
wherein the power control circuit turns off the first transistor before performing power gating on the cache memory,
wherein the power control circuit turns on the first transistor after stopping power gating of the cache memory,
wherein the power control circuit turns off the second transistor before performing power gating on the input/output interface, and
wherein the power control circuit turns on the second transistor after stopping power gating of the input/output interface.

10. A semiconductor device comprising:
a bus line;
a signal processing circuit;
a cache memory configured to be supplied with a first address signal from the signal processing circuit through the bus line;
an input/output interface configured to be supplied with a second address signal from the signal processing circuit through the bus line;
a sub-signal processing circuit configured to be booted up by the signal processing circuit;
an address monitoring circuit acquiring the first address signal and the second address signal;
a power control circuit performing power gating on the signal processing circuit, the cache memory, and the input/output interface;
a power supply circuit electrically connected to the signal processing circuit through a first node, electrically connected to the cache memory through a second node, and electrically connected to the input/output interface through a third node;
a first transistor including a first oxide semiconductor film as a semiconductor layer;
a second transistor including a second oxide semiconductor film as a semiconductor layer;
a third transistor including a third oxide semiconductor film as a semiconductor layer;
a first capacitor electrically connected to the first node through a source and a drain of the first transistor;
a second capacitor electrically connected to the second node through a source and a drain of the second transistor; and
a third capacitor electrically connected to the third node through a source and a drain of the third transistor,
wherein switching of the first to third transistors is controlled by the power control circuit,
wherein the power control circuit is configured to select whether power gating of the signal processing circuit is performed or not according to whether the sub-signal processing circuit is booted up or not,
wherein the power control circuit is configured to select whether power gating of the cache memory is performed or not in response to the first address signal, wherein the power control circuit is configured to select whether power gating of the input/output interface is performed or not in response to the second address signal, wherein the first capacitor is electrically connected to the signal processing circuit through the first node, wherein the second capacitor is electrically connected to the cache memory through the second node, and wherein the third capacitor is electrically connected to the input/output interface through the third node.

11. The semiconductor device according to claim 10, further comprising:
    a first switch between the power supply circuit and the first node;
    a second switch between the power supply circuit and the second node; and
    a third switch between the power supply circuit and the third node,
    wherein switching of the first to third switches is controlled by the power control circuit.

12. The semiconductor device according to claim 10,
wherein the power control circuit turns off the first transistor before performing power gating on the signal processing circuit,
wherein the power control circuit turns on the first transistor after stopping power gating of the signal processing circuit,
wherein the power control circuit turns off the second transistor before performing power gating on the cache memory,
wherein the power control circuit turns on the second transistor after stopping power gating of the cache memory,
wherein the power control circuit turns off the third transistor before performing power gating on the input/output interface, and
wherein the power control circuit turns on the third transistor after stopping power gating of the input/output interface.

13. The semiconductor device according to claim 10,
wherein the first to third transistors and the first to third switches are stacked.

14. The semiconductor device according to claim 10,
wherein the signal processing circuit comprises a volatile register and a nonvolatile register.

15. The semiconductor device according to claim 14,
wherein the nonvolatile register comprises a fourth transistor including an oxide semiconductor film as a semiconductor layer.

16. The semiconductor device according to claim 15,
wherein the volatile register comprises a fifth transistor including a portion of a single crystal silicon substrate as a semiconductor layer.

17. The semiconductor device according to claim 16,
wherein the first transistor is stacked with the second transistor.

* * * * *